US007558850B2

(12) United States Patent
Chambliss et al.

(10) Patent No.: US 7,558,850 B2
(45) Date of Patent: Jul. 7, 2009

(54) METHOD FOR MANAGING INPUT/OUTPUT (I/O) PERFORMANCE BETWEEN HOST SYSTEMS AND STORAGE VOLUMES

(75) Inventors: David Darden Chambliss, Morgan Hill, CA (US); Bruce Light Hillsberg, San Carlos, CA (US); Divyesh Jadav, San Jose, CA (US); Jaishankar Moothedath Menon, San Jose, CA (US); Prashant Pandey, San Jose, CA (US); Jian Xu, San Jose, CA (US); Ramachandran Gopalakrishna Menon, Sunnyvale, CA (US); Tzongyu Paul Lee, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 827 days.

(21) Appl. No.: 10/663,559

(22) Filed: Sep. 15, 2003

(65) Prior Publication Data

US 2005/0076154 A1 Apr. 7, 2005

(51) Int. Cl.
*G06F 15/173* (2006.01)
(52) U.S. Cl. ...................... 709/224; 709/232
(58) Field of Classification Search ................ 709/224, 709/223, 232; 370/229
See application file for complete search history.

(56) References Cited

U.S. PATENT DOCUMENTS

| | | | |
|---|---|---|---|
| 6,003,047 A | 12/1999 | Osmond et al. | |
| 6,219,700 B1 | 4/2001 | Chang et al. | |
| 6,363,053 B1 | 3/2002 | Schuster et al. | |
| 7,082,463 B1 * | 7/2006 | Bradley et al. | ............... 709/223 |
| 2002/0019908 A1 | 2/2002 | Reuter et al. | |
| 2002/0052941 A1 | 5/2002 | Patterson | |
| 2002/0056005 A1 | 5/2002 | Weik | |

(Continued)

FOREIGN PATENT DOCUMENTS

WO    WO-01/59967    8/2001

(Continued)

OTHER PUBLICATIONS

Yang et al., "Scheduling with dynamic bandwidth allocation for Diff Serv classes" Computer Communications and Networks, 2003. ICCCN 2003. Proceedings. The 12th International Conference on Oct. 20-22, 2003 pp. 319-324.*

(Continued)

*Primary Examiner*—Patrice Winder
*Assistant Examiner*—William J Goodchild
(74) *Attorney, Agent, or Firm*—Konrad Raynes & Victor LLP; David W. Victor

(57) ABSTRACT

Provided is a method for managing a network providing Input/Output (I/O) paths between a plurality of host systems and storage volumes in storage systems. An application service connection definition is provided for each connection from a host to a storage volume. At least one service level guarantee definition is provided indicating performance criteria to satisfy service requirements included in at least one service level agreement with at least one customer for network resources. Each service level guarantee definition is associated with at least one application service connection definition. Monitoring is performed as to whether Input/Output (I/O) requests transmitted through the multiple I/O paths satisfy performance criteria indicated in the service level guarantee definition associated with the I/O paths.

17 Claims, 13 Drawing Sheets

U.S. PATENT DOCUMENTS

| | | | |
|---|---|---|---|
| 2002/0116479 A1 | 8/2002 | Ishida et al. | |
| 2002/0133328 A1 | 9/2002 | Bowman-Amuah | |
| 2002/0138610 A1 | 9/2002 | Miyazawa et al. | |
| 2002/0138642 A1 | 9/2002 | Miyazawa et al. | |
| 2002/0152305 A1 | 10/2002 | Jackson et al. | |
| 2002/0156867 A1 | 10/2002 | Iwami | |
| 2002/0169866 A1 | 11/2002 | Lim et al. | |
| 2002/0174222 A1 | 11/2002 | Cox | |
| 2002/0174227 A1 | 11/2002 | Hartsell et al. | |
| 2002/0194324 A1* | 12/2002 | Guha | 709/223 |
| 2003/0135609 A1* | 7/2003 | Carlson et al. | 709/224 |
| 2004/0049564 A1* | 3/2004 | Ng et al. | 709/223 |
| 2004/0236846 A1* | 11/2004 | Alvarez et al. | 709/223 |
| 2004/0243699 A1* | 12/2004 | Koclanes et al. | 709/224 |

FOREIGN PATENT DOCUMENTS

| | | |
|---|---|---|
| WO | WO-02/39693 | 5/2002 |
| WO | WO-02/089014 | 11/2002 |

OTHER PUBLICATIONS

Ludwig, H., "Web services QoS: external SLAs and internal policies or: how do we deliver what we promise?" Web Information Systems Engineering Workshops, 2003. Proceedings. Fourth International Conference on Dec. 13, 2003 pp. 115-120.*

IBM Corporation, "Ethernet Bandwith Management", *IBM Technical Disclosure Bulletin*, Mar. 1994, pp. 591-594, vol. 37, No. 3.

IBM Corporation, "TN3270(E) Host Based Correlation and Performance Management", *IBM Research Disclosure*, Jun. 1998, No. 410137.

U.S. Appl. No. 09/543,207, filed Apr. 5, 2000, entitled "Highly Scalable System and Method of Regulating Internet Traffic to Server Farm to Support (Min/Max) Bandwidth Usage-Based Service Level Agreements", invented by K. Maruyama, G. Goldszmidt, & K. Appleby-Hougham.

U.S. Appl. No. 09/642,526, filed Aug. 18, 2003, entitled "Electronic Service Level Agreement for Web Site and Computer Services Hosting", invented by A. Dan, D. Dias, & J. L. Hellerstein.

U.S. Appl. No. 10/315,376, filed Dec. 10, 2002, entitled "Programmatically Allocating Memory among Competing Services in a Distributed Computing Environment", invented by J. Chase & R. Doyle.

* cited by examiner

Application Storage Connection (ASC) Record

Application Storage Group (ASG) Record

Service Level Guarantee (SLG) Record

Service Level Commitment (SLC) Record

FIG. 14a

```xml
<?xml version="1.0" ?>
<ASG ASG_Name="ASG_1">
  <ASC ASC_Name="ASC_1">
     <AppHost WWN="80" />
     <GatewayPort PortName="88" />
     <LogicDiskUnit PortableName="LU1">
       <CLUSTER_ID>1</CLUSTER_ID>
       <HLUN_ID>11</HLUN_ID>
     </LogicDiskUnit>
  </ASC>
    <ASC ASC_Name="ASC_2">
      <AppHost WWN="81" />
      <GatewayPort PortName="88" />
      <LogicDiskUnit PortableName="LU2">
        <CLUSTER_ID>2</CLUSTER_ID>
        <HLUN_ID>22</HLUN_ID>
     </LogicDiskUnit>
  </ASC>
    <ASC ASC_Name="ASC_3">
      <AppHost WWN="82" />
      <GatewayPort PortName="88" />
      <LogicDiskUnit PortableName="LU3">
        <CLUSTER_ID>3</CLUSTER_ID>
        <HLUN_ID>33</HLUN_ID>
     </LogicDiskUnit>
  </ASC>
    <ASC ASC_Name="ASC_4">
      <AppHost WWN="83" />
      <GatewayPort PortName="88" />
      <LogicDiskUnit PortableName="LU4">
        <CLUSTER_ID>4</CLUSTER_ID>
        <HLUN_ID>44</HLUN_ID>
     </LogicDiskUnit>
  </ASC>
</ASG>
```

FIG. 14b

```xml
<?xml version="1.0" ?>
- <SLC>
    <SLC_Name>SLC_1</SLC_Name>
    <Author>John Smith</Author>
    <CustomerCode Major="ABC" Minor="123" />
    <SLG_Name>SLG_1</SLG_Name>
    <ASG_Name>ASG_1</ASG_Name>
    <ASG_Name>ASG_2</ASG_Name>
    <ASG_Name>ASG_3</ASG_Name>
    <ThrottlingPercentage>5</ThrottlingPercentage>
  - <RetentionPeriod>
      <Interval Value="24" Unit="hour" />
    </RetentionPeriod>
  - <Reporting>
      <Interval Value="60" Unit="sec" />
    </Reporting>
  </SLC>
```

FIG. 14c

```xml
<?xml version="1.0" ?>
- <SLG SLG_Name="SLG_1">
   - <SLG_Class ClassName="GOLD">
      <Priority>2</Priority>
     - <Evaluation>
         <Interval Value="10" Unit="ms" />
      </Evaluation>
      <PercentageGuarantee>95</PercentageGuarantee>
      <MRT UpperLimit="10" />
      <NDT LowerLimit="1" />
      <NDI LowerLimit="10" />
   </SLG_Class>
</SLG>
```

US 7,558,850 B2

METHOD FOR MANAGING INPUT/OUTPUT (I/O) PERFORMANCE BETWEEN HOST SYSTEMS AND STORAGE VOLUMES

BACKGROUND OF THE INVENTION

1. Field of the Invention

The present invention is related to a method, system, and program for managing I/O performance between host systems and storage volumes.

2. Description of the Related Art

A storage service provider may maintain a large network, such as a Fibre Channel Storage Area Network (SAN), to service the computing needs for one or more customers. The SAN includes numerous host systems including the customer applications linked via a Fibre Channel fabric to one or more storage systems, such as one or more interconnected disk drives configured as a Redundant Array of Independent Disks (RAID), Just a Bunch of Disks (JBOD), Direct Access Storage Device (DASD), etc. Typically, a customer will pursue a service level agreement (SLA) with the storage service provider concerning the criteria under which network storage resources are provided, such as the storage capacity, network throughput, I/O response time, I/O operations per second, and other performance criteria under which the network resources will be provided. In certain situations, multiple customers with different levels of requirements specified in their service level agreements will share the same network resources. This requires that the storage service provider monitor and manage the network resources to ensure that the different customer requirements specified in the different service level agreements are satisfied.

Accordingly, there is a need in the art to provide a method to specify the service level agreements and performance requirements to ensure that customers of these storage resources receive service according to the agreed upon performance criteria for providing the network resources.

SUMMARY OF THE PREFERRED EMBODIMENTS

Provided are a method, system, and program for managing a network providing Input/Output (I/O) paths between a plurality of host systems and storage volumes in storage systems. An application service connection definition is provided for each connection from a host to a storage volume. At least one service level guarantee definition is provided indicating performance criteria to satisfy service requirements included in at least one service level agreement with at least one customer for network resources. Each service level guarantee definition is associated with at least one application service connection definition. Monitoring is performed as to whether Input/Output (I/O) requests transmitted through the multiple I/O paths satisfy performance criteria indicated in the service level guarantee definition associated with the I/O paths.

In further implementations, multiple service level guarantee definitions indicating different performance criteria are associated with different sets of application service connection definitions.

In still further implementations, an application service group is provided identifying a plurality of application service connection definitions, wherein associating the service level guarantee definition with the application service connection definitions comprises associating each service level guarantee definitions with at least one application service group, wherein the application service connection definitions identified in the application service group are associated with the service level guarantee definitions with which their application service group is associated.

In additional implementations, monitoring whether Input/Output (I/O) requests transmitted through the multiple I/O paths satisfy performance criteria indicated in the service level guarantee definition comprises: gathering performance information concerning I/O requests for each connection; selecting one service level guarantee definition; and for each connection identified by one application service connection definition associated with the selected service level guarantee definition, comparing the gathered performance information for the connection with the performance criteria indicated in the selected service level guarantee definition.

Additionally, the operations among the I/O paths represented by the application service connection definitions associated with the selected service level guarantee definition may be adjusted if the gathered performance information for the I/O paths does not satisfy the performance criteria.

BRIEF DESCRIPTION OF THE DRAWINGS

Referring now to the drawings in which like reference numbers represent corresponding parts throughout:

FIG. 14*a* illustrates how the service level agreement elements are defined in an XML format.

FIG. 14*b* illustrates how the service level commitment information is implemented in the XML format.

FIG. 14*c* illustrates how the service level guarantee (SLG) information is implemented in the XML format.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
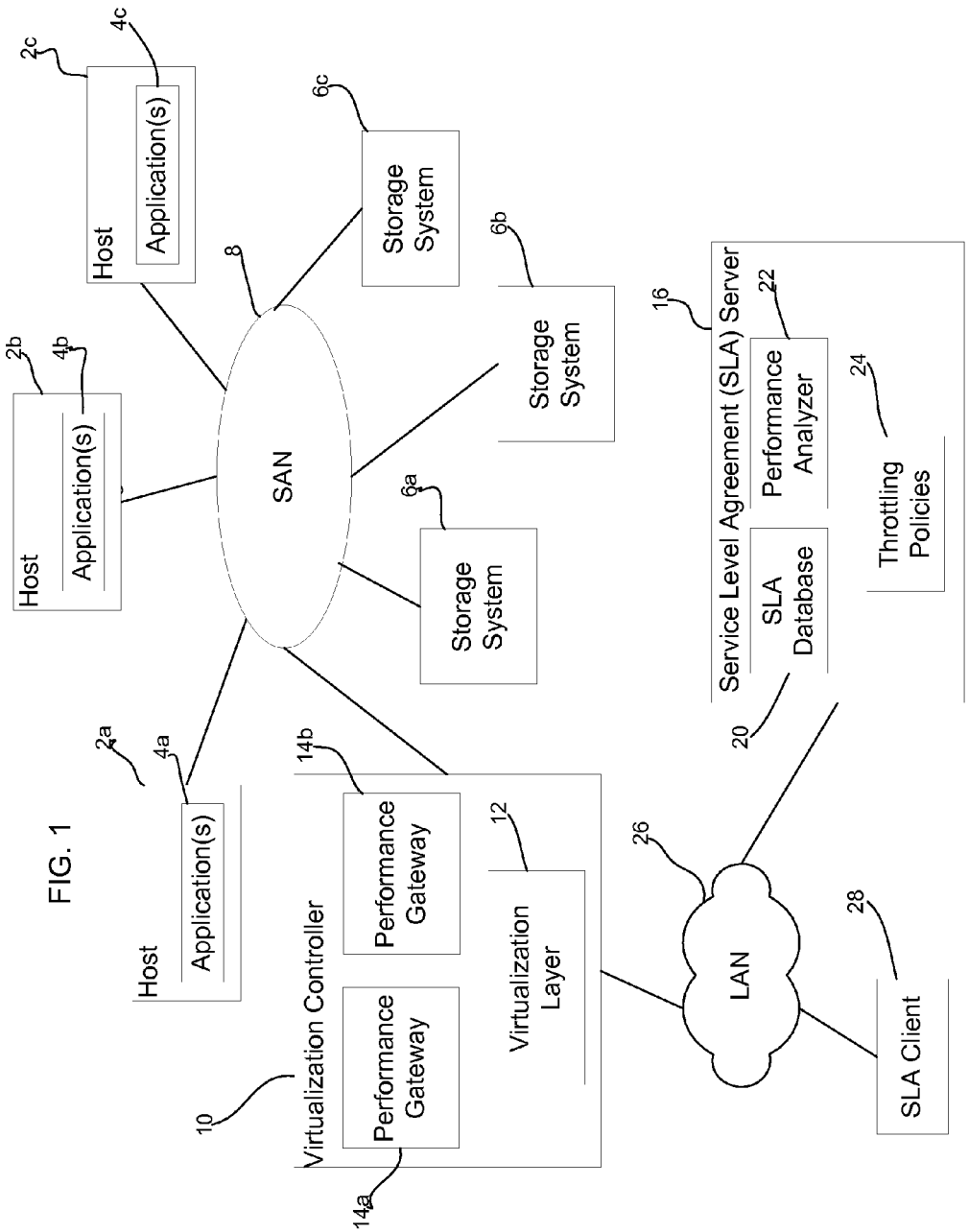
FIGS. 1 and 2 illustrate network computing environments in which embodiments of the invention are implemented.

FIG. 1 illustrates a network computing environment in which embodiments of the invention are implemented. A plurality of host systems 2*a*, 2*b*, 2*c* including one or more application programs 4*a*, 4*b*, 4*c* are in communication with a plurality of storage systems 6*a*, 6*b*, 6*c* over a network 8, such as a Fibre Channel Storage Area Network (SAN). The host systems 2*a*, 2*b*, 2*c* may comprise any computing device known in the art, such as a server class machine, workstation, desktop computer, etc. The storage systems 6*a*, 6*b*, 6*c* may comprise any mass storage device known in the art, such one or more interconnected disk drives configured as a Redundant Array of Independent Disks (RAID), Just a Bunch of Disks (JBOD), Direct Access Storage Device (DASD), as a tape storage device, e.g., a tape library, or etc.

A virtualization controller 10 is a system that is connected to the SAN 8 and implements a virtualization layer 12 for the SAN 8 to present the storage space available in the storage systems 6a, 6b, 6c as one or more common virtual storage pools. The virtualization layer 12 maps the physical storage resources available in the storage systems 6a, 6b, 6c to virtual volumes in the virtualization layer 12. For instance, physical storage in different storage systems 6a, 6b, 6c can be organized in the virtualization layer 12 as a single virtual volume. The virtualization controller 10 further implements multiple performance gateways 14a, 14b.

Each Input/Output path between a host application 4a, 4b, 4c, and a storage system 6a, 6b, and 6c is assigned to a particular performance gateway 14a, 14b. The performance gateways 14a, 14b intercept the I/O command for the assigned path (e.g., host and application) and records performance data for the I/O command, such as access time, time to complete, I/O throughput, etc. Thus, any I/O commands and data transferred between the applications 4a, 4b, 4c and storage systems 6a, 6b, 6c, represented as common storage pools in the virtualization layer 12, are handled by the performance gateway 14a, 14b to which the path on which the I/O commands and/or data is transmitted. The performance gateway 14a, 14b sends any gathered performance data to a service level agreement (SLA) server 16. The SLA server 16 includes an SLA database 20 including information on I/O paths and the criteria for different service level agreements. The SLA server 16 processes information in the SLA database 20 determine how to process the performance information received from the performance gateways 14a, 14b. The SLA server 16 includes a performance analyzer 22 to analyze the performance statistics received from the performance gateways 14a, 14b. The performance analyzer 22 may generate reports on the results of measuring I/O performance with respect to I/O paths among the hosts 2a, 2b, 2c and the storage systems 6a, 6b, 6c. The throttling policies 24 include information that indicates how the SLA server 16 is to adjust I/O activity to optimize performance based on the performance information gathered at the performance gateways 14a, 14b. An service level agreement (SLA) client 28 communicates with the SLA server 16 using a protocol, such as the Hypertext Transfer Protocol (HTTP). A user or administrator may use the SLA client 28 to interface with the SLA server 16 to provide input on service criteria and access performance reports and statistics generated by the performance analyzer 22.

In certain implementations, the virtualization controller 10 may transmit the gathered performance data to the SLA server 16 over another network, such as a Local Area Network 26.

Figure 2:
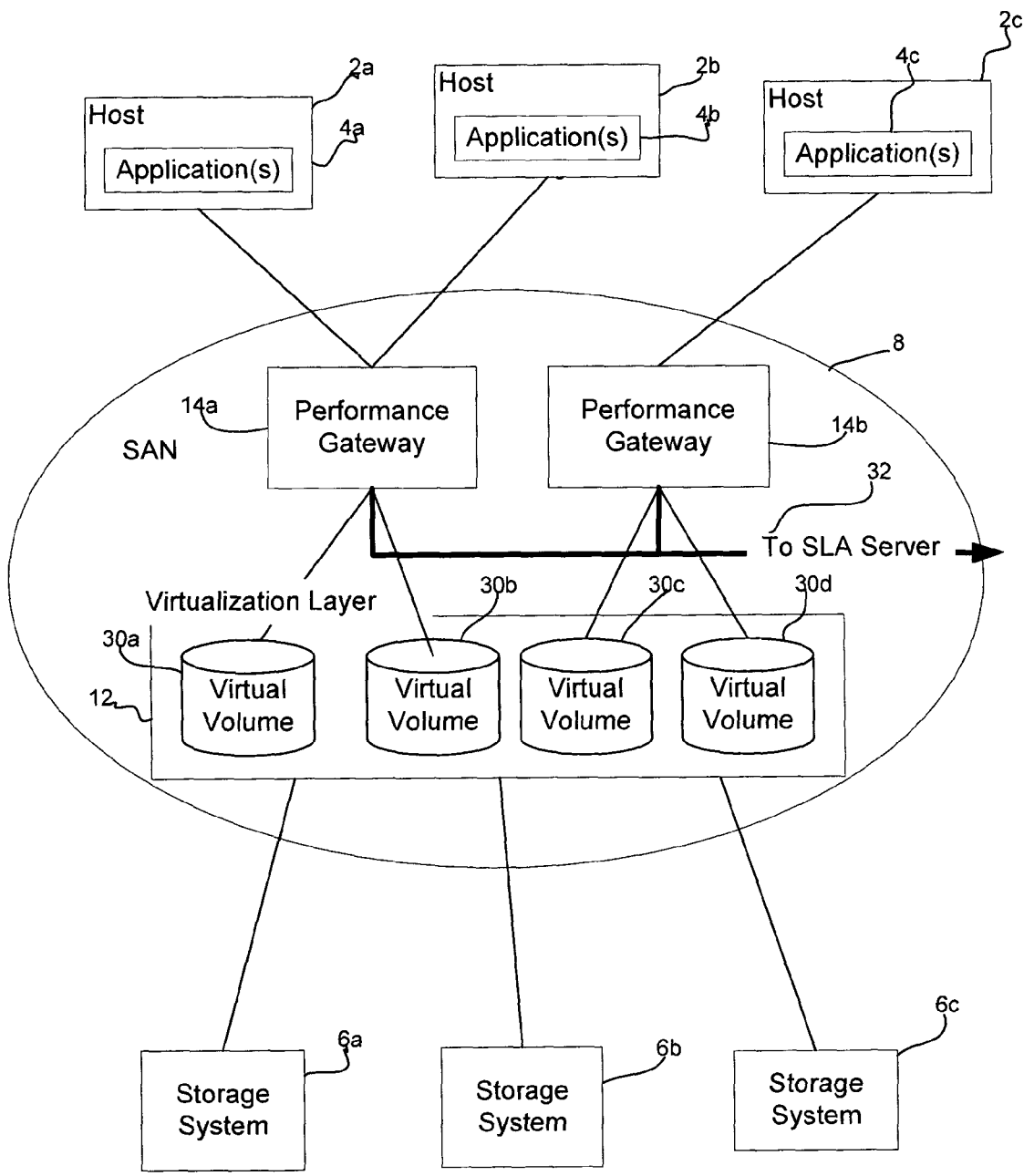

FIG. 2 provides a further illustration of the connection between the hosts 2a, 2b, 2c and the storage systems 6a, 6b, 6c. The paths from the host applications 4a, 4b, 4c connect to one of the performance gateways 14a, 14b, implemented in the virtualization controller 10, and from the performance gateways 14a, 14b to one virtual volume 30a, 30b, 30c, 30d implemented in the virtualization layer 12. Different host applications in one host systems may have different paths that are assigned to different or the same performance gateways. The storage in each virtual volume 30a, 30b, 30c, 30d maps to one or more of the physical storage systems 6a, 6b, 6c. The connection 32 from the performance gateways 14a, 14b to the SLA server 16 (FIG. 1), which may comprise a LAN connection 26 (e.g., a TCP/IP connection), is also illustrated.

Figure 3:
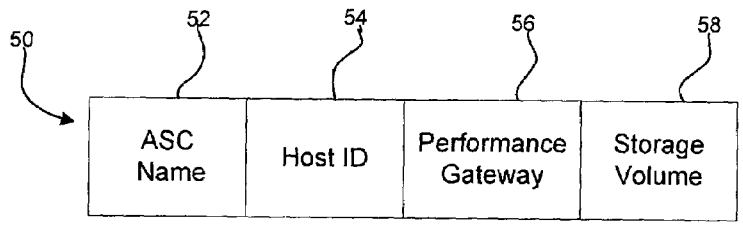
FIGS. 3, 4, 5, 6, 7, and 8 illustrate an arrangement of information on I/O paths between hosts and storage volumes and service level requirements providing performance criteria for service level agreements and associations therebetween in accordance with implementations of the invention.

The SLA database 20 includes information on service level agreements between customers and the storage service provider that maintains the SAN network and storage resources. An administrator may use the SLA client 28 to input the information on the service level agreements. An application storage connection (ASC) record would be maintained for each connection between a host system 2a, 2b, 2c and storage volume 30a, 30b, 30c, 30d in the SAN 8 that is established pursuant to a service level agreement. FIG. 3 illustrates the fields maintained in an application storage connection record 50 as including:

ASC Name 52: a unique name for an application storage connection (ASC) between one host and a storage volume, either virtual or physical.

Host 54: a unique identifier of a host used to represent the host in the SAN 8, such as a world wide name (WWN) recognized in the Fibre Channel network.

Performance Gateway 56: a port identifier in the performance gateway 14a, 14b monitoring a connection between the application host 2a, 2b, 2c and a storage system 6a, 6b, 6c.

Logical Volume 58: the name of a logical volume 30a, 30b, 30c, 30d or physical storage system 6a, 6b, 6c which the host 54 can access through the connection represented by the ACS record.

Figure 4:
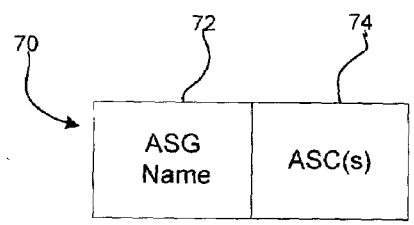

The storage service provider of the SAN 8 may further define, using the SLA client 28, one or more application storage groups (ASGs), each identifying one or more application storage connections, where a single application storage connection, represented by one ASC record 50, may be included in multiple application storage groups. FIG. 4 illustrates an application storage group (ASG) record 70 as including a unique ASG name 72 and the unique identifier of one or more application storage connections (ASCs) 74 assigned to the group. In determining which application storage connections to assign to an application storage group, the administrator may assign ASCs that all must satisfy a minimum performance criteria defined within the one or more service level agreements that specify performance criteria for the application storage connections within the group.

Figure 5:
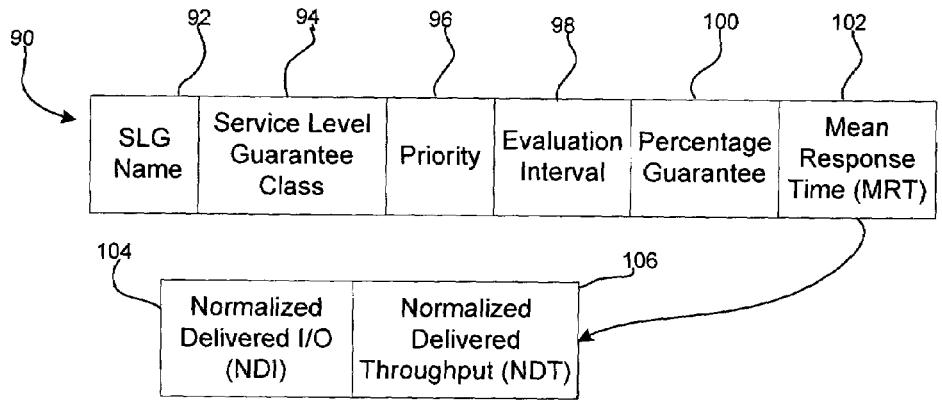

The storage service provider may further define, using the SLA client 28, a plurality of service level guarantees that define performance guarantees defining the level of performance the storage service provider must provide pursuant to one or more service level agreements. A defined service level guarantee may apply to one or more application storage groups to define the level of service and performance expected of the connections identified by the application service connections (ASCs) included in the application service groups (ASGs) to which the service level guarantee is assigned. FIG. 5 illustrates information included in a service level guarantee record 90, including:

Service Level Guarantee (SLG) Name 92: a unique name of the service level guarantee.

Service Level Guarantee Class 94: the network storage service provider may define classes that describe the nature of the performance specified for the service level guarantee, such as standard for general applications; premium transaction for transactional applications that require high I/O operations per second; and premium throughput for applications that require high throughput, e.g., megabytes per second.

Priority 96: a numeric representation of the priority of the SLG, from high to low.

Evaluation Interval 98: the time interval during which performance is evaluated. This value may indicate a number of units and a choice of time, such as five evaluations per hour, etc.

Percentage Guarantee 100: a percentage of the I/O operations that shall meet the defined performance requirements during the evaluation period.

Mean Response Time (MRT) 102: a mean response time for each I/O operation in milliseconds (MS).

Normalized Delivered I/O (NDI) 104: a normalized number of I/O operations per second per contracted storage unit, e.g., 100 gigabyte of contracted capacity (IOPS/100 GB).

Normalized Delivered Throughput (NDT) 106: a normalized number of megabytes per second perf contracted storage unit, e.g., 100 gigabytes of contracted capacity.

In certain implementations, different performance characteristics, e.g., MRT, NDI, and NDT, may be specified for each performance class, e.g., standard, premium transactions, premium throughput. The NDI 104 and NDT 106 are demand metrics in that their value depends on the demand of the customer workload whereas the MRT is a delivery metric and is a measure of the quality of the service regardless of the workload. The SLA server 16 would compare the actual measured performance metrics with the demand and response time criteria specified for the service level guarantee. For instance, if demand is less than agreed upon limits, then the response time is guaranteed to be less than the agreed upon MRT and the service level agreement performance criteria is met. However, when demand exceeds agreed upon limits, i.e., the actual throughput or I/Os per second exceeds the agreed upon limits, then the I/O access is exempt from the mean response time (MRT) requirement.

Figure 6:
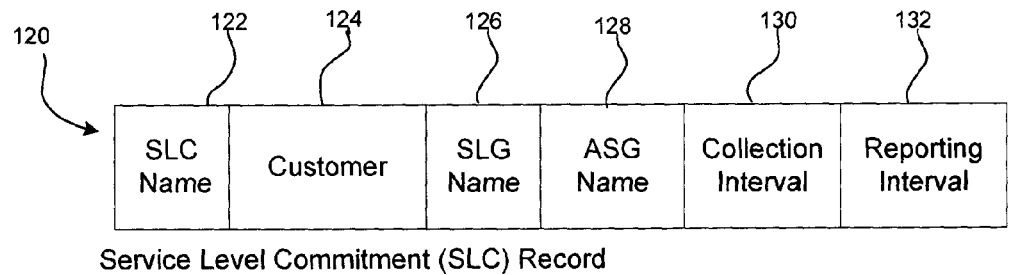

Another relational layer is the service level commitment (SLC) defined by the storage service provider which is used to apply one defined service level guarantee (SLG) to one or more application service groups (ASG) for a particular customer having multiple hosts connected to the SAN 8. FIG. 6 illustrates a service level commitment (SLC) record 120 as including:

SLC Name 122: a unique name of the service level commitment.

Customer 124: name of the customer to which the assigned service level guarantee applies.

SLG Name 126: the name of a defined service level guarantee (SLG) 90 providing commitments for the named customer.

ASG Names 128: the name of one or more appellation service groups including application service connections for the customer to which the SLG will apply.

Collection Interval 130: the time period during which the system will gather statistic data of ASGs defined by value and unit.

Reporting Interval 132: The interval at which the system will send collected statistics on performance data of the ASGs, defined by value and unit, to the performance analyzer 22 in the SLA server 16. The collection and reporting intervals 130 and 132 may be adjusted.

The storage service provider may review a service level agreement for a customer and then assign, using the SLA client 28, service level commitments to application service groups of application service connections for a customer by defining service level commitments for that customer. The storage service provider may enter information on connections (ASCs), groups of connections (ASGs), performance criteria (SLGs), and the relation therebetween (SLCs) at the SLA client 28, where the defined ASCs, ASGs, SLGs, and SLCs are stored in the SLA database 20. Each instance of the above records (e.g., ASC, ASG, SLG, and SLC records) may be implemented in an Extensible Markup Language (XML) file or records within a database.

Figure 7:
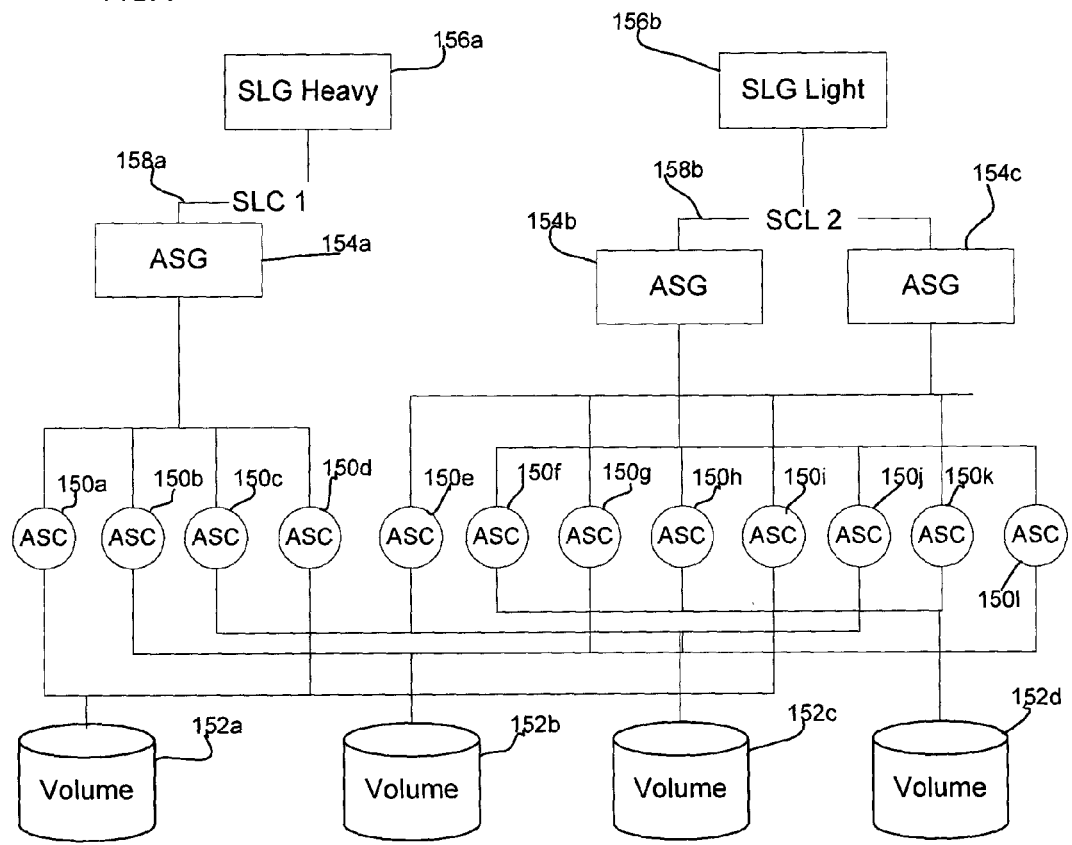

FIG. 7 illustrates a relationship among the different above defined records. A plurality of application service connection (ASC) 150a, 150b . . . 150l, each defining a connection from a host to one logical or physical storage volume 152a, 152b, 152c, and 152d, are grouped within application service groups 154a, 154b, and 154c, as shown by the connecting lines. Different service level guarantees 156a, 156b, one heavy and light, respectively, are associated with different of the application service groups 154a, 154b, 154c through service level commitment 158a, 158b associations.

When the service level agreement (SLA) server 16 determines that certain service level guarantees are not being satisfied for an application service group (ASG), then the SLA server 16 may apply a predefined throttling policy 24 to alter and effect the performance. This throttling policy may cause the performance gateways 14a, 14b that manage the I/O paths to delay the I/O transmitted through I/O paths that are over performing associated service level guarantees to improve the performance of I/O paths that are underperforming.

Figure 8:
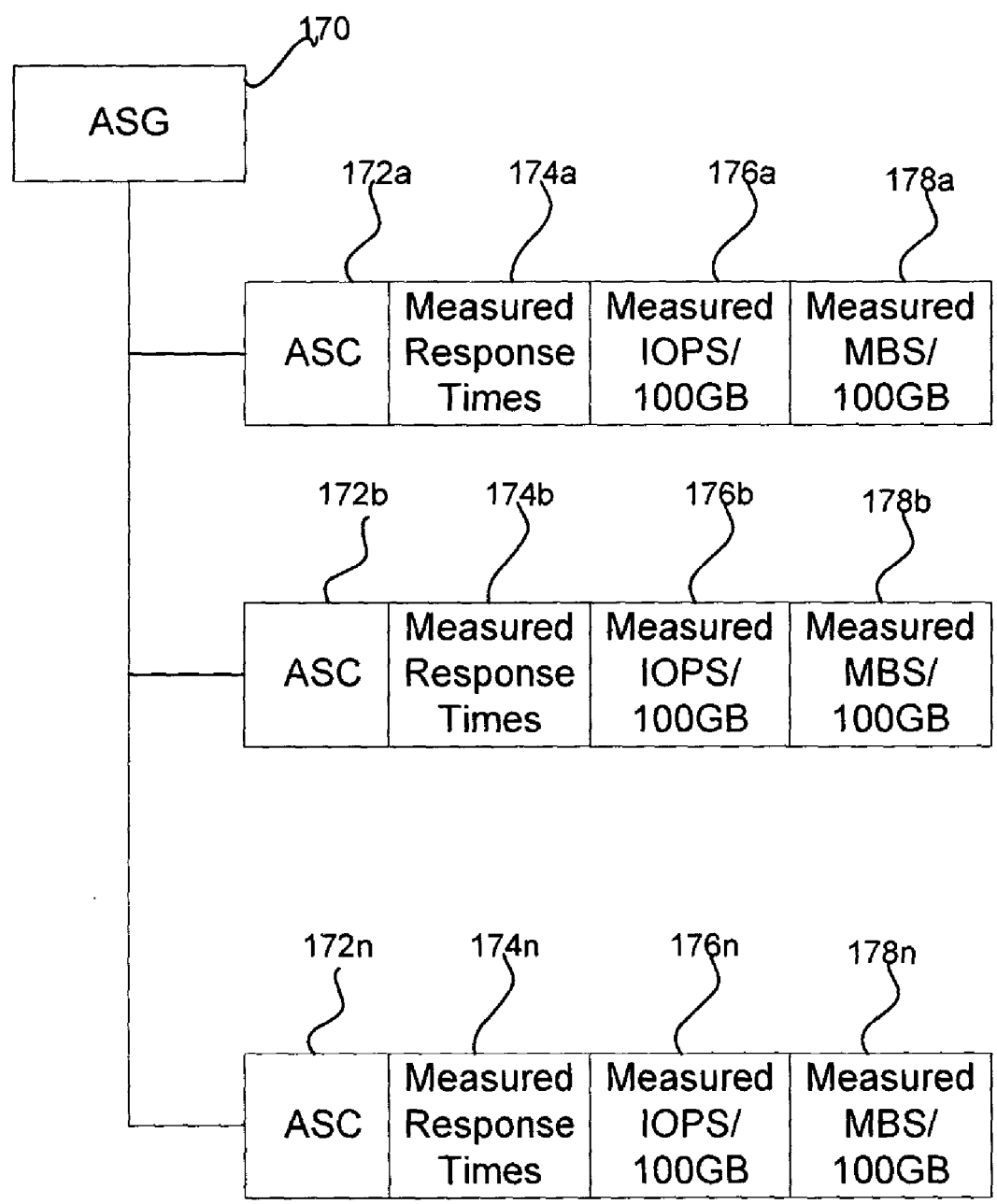

FIG. 8 illustrates how the service level agreement server (SLA) 16 gathers performance data by application service group 170. The SLA server 16 will gather performance data for each application service connection (ASC) 172a, 172b . . . 172n (FIG. 8) defined for the application service group (ASG) 170, including the measured response times 174a, 174b . . . 174n for I/O operations, the number of I/O operations per second per 100 gigabytes of contracted capacity 176a, 176b . . . 176n (IOPS/100 GB), and the number of megabytes per second per 100 gigabytes of contracted capacity 178a, 178b . . . 178n (MBPS/100 GB). Such information may be maintained for each defined ASG and the ASCs defined therein.

Figure 9:
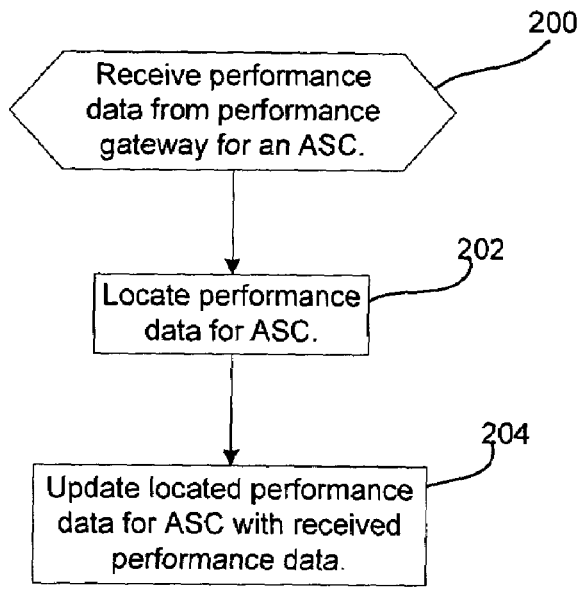
FIGS. 9, 10, 11, and 12 illustrate operations performed to utilize the information described with respect to FIGS. 3-8 to manage the network shown in FIGS. 1 and 2.

FIG. 9 illustrates operations performed by the SLA server 16 when receiving (at block 200) performance data gathered by one performance gateway 14b, the SLA server 16 locates (at block 202) the performance data for the ASC 172a, 172b . . . 172n (FIG. 9) for which the performance data was received. The located performance data for the ASC 172a, 172b . . . 172c is updated (at block 204) with the new received performance data. In this way, the performance data may maintain each instance of a measured performance parameter, such as response time for each I/O request, I/O operations per second, I/O throughput.

Figure 10:
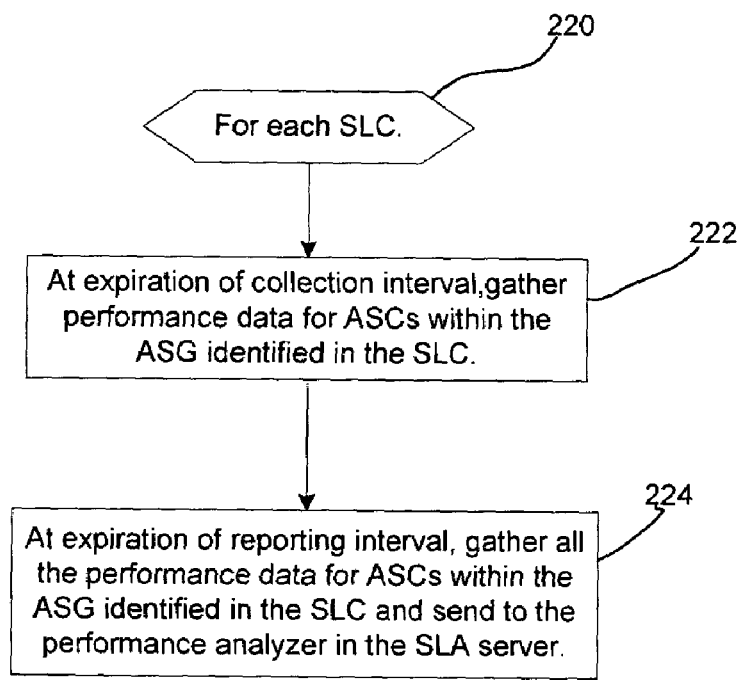
Figure 11:
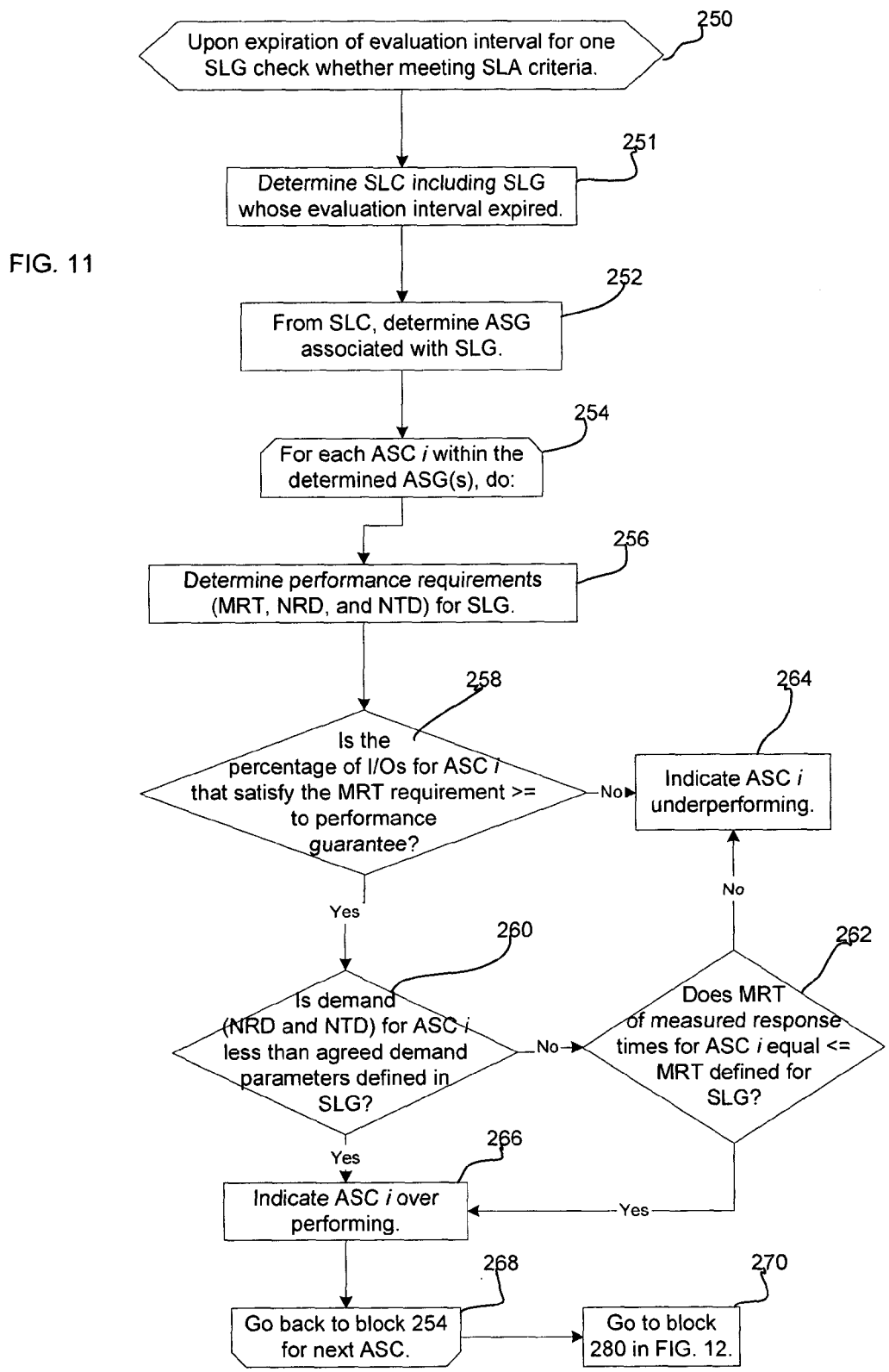
Figure 12:
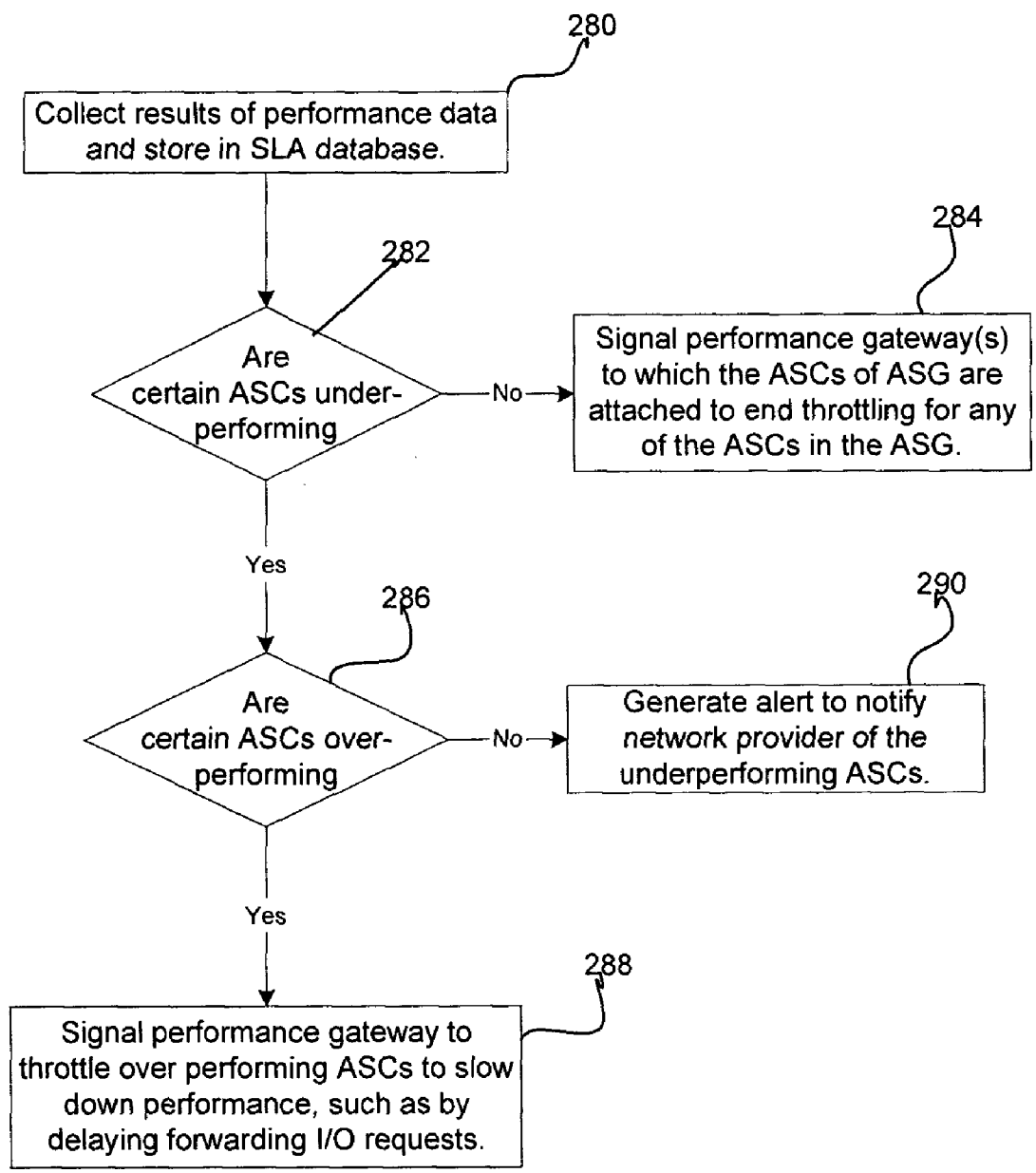

FIG. 10 illustrates operations performed by the SLA server 16 to collect reporting data according to time limitations included in the service level guarantees records 90 in the SLA database 20. For each defined SLC record 120 (FIG. 6) (at block 220), the SLA server 16 will gather (at block 222) after the collection interval all the performance data for ASCs 172a, 172b . . . 172n within the ASG 170 identified in the ASG name field 128 (FIG. 6) in the SLC record 120. Further, at the expiration of the reporting interval 132 for each SLC record 120, the SLA server 16 will collect (at block 224) all the performance data for ASCs 172a, 172b . . . 172n, including the measured response times 174a, 174b . . . 174n, measured IOPS/100 GB 176a, 176b . . . 176n, and measured MBS/100 GB 178a, 178b . . . 178n, within the ASG 170 identified in the ASG name field 128 of the SLC record 120 being processed, and send such gathered statistics and performance data to the SLA client 28. The SLA server 16 may run a timer, continually reset upon expiration, for each collection interval 130 and reporting interval 132 identified in each SLC record 120 to perform steps 222 and 224 when the timer runs to zero. The timers would be reset and run again FIGS. 11 and 12 illustrate logic implemented in the SLA server 16 to determine whether application service connections (ASCs) 150a, 150b . . . 150l (FIG. 7) satisfy service level guarantee definitions 156a, 156b with which they are associated. Upon the expiration (at block 250) of the evaluation interval 98 for one SLG record 90 (FIG. 5), the SLA server 16 would begin operations to determine whether the performance criteria for the SLG 156a, 156b are being satisfied with respect to the application service connections (ASCs) 150a, 150b . . . 150l to which the service level guarantees apply. The SLA server 16 may initialize a timer for each evaluation interval 98 in each SLG record 90 to determine when to initiate the performance checking procedure. The SLA server 16 then determines (at block 251) the service level commitment (SLC) 158a, 158b whose SLG name field 126 (FIG. 6) identifies the SLG 156a, 156b whose evaluation timer expired. From the ASG name field 128 in the record 120 for the determined service level commitment (SLC) 158a, 158b, the SLA server 16 determines (at block 252) the one or more application service groups (ASG) 154a, 154b, 154c that are associated with the service level guarantees (SLG) 156a, 156b to check.

The SLA server 16 then performs a loop at blocks 254 through 268 for each application service connection (ASC) 150a, 150b . . . 150l in each of the determined one or more application service groups (ASG) 154a, 154b, 154c. At block 256, the SLA server 16 determines the performance requirements for the ASC i from the service level agreement (SLG) 156a, 156b being checked, including the mean response time (MRT) 102, the normalized delivered I/O (NDI) 104, and the normalized delivered throughput (NDT) 106 (FIG. 5). These desired performance criteria may be specified as a range, such as greater and/or less than a value and unit. The SLA server 16 then determines (at block 258) whether the percentage of I/Os for ASC i that satisfies the MRT requirement 102 is greater than or equal to the percentage guarantee 100 for the SLG being checked. As discussed, the ASC performance statistics 172a, 172b . . . 172n would include the measured response times 174a, 174b . . . 174n for a measured time interval. The SLA server 16 may process these measured response times to determine the percentage of such response times that satisfy the MRT requirement 102 to accomplish the step at block 258.

If (at block 258) the measured response times do satisfy the percentage guarantee 100, then the SLA server 16 determines (at block 260) whether the demand level for the connection represented by ASC i is less than the agreed demand level. As discussed, the measured demand is determined from I/O operations per second 176a, 176b . . . 176n and the number of megabytes per second 178a, 178b . . . 178n measured for the ASC i and whether this measured activity falls within the agreed upon demand parameters, e.g., the normalized delivered I/O (NDI) 104 and the normalized delivered throughput (NDT) 106 indicated in the service level guarantee 90 record being checked. If (at block 260) the demand satisfies agreed upon SLG demand parameters, then a determination is made (at block 262) whether the mean response time (MRT) of the measured response times 174a, 174b . . . 174n (FIG. 8) for ASC i is less than or equal to the MRT 102 in the SLG record 90 (FIG. 5) for the service level guarantee being checked. If (from the no branch of block 258) the measured response time does not satisfy the percentage guarantees 100 or if (from the no branch of block 262) the measured mean response time (MRT) does not meet the agreed criteria indicated in the MRT field 102 of the SLG record 90, then an indication is made (at block 264) that ASC i is underperforming. Otherwise, if the performance guarantee is satisfied (from the yes branch of block 258) and the demand does not exceed agreed upon levels (from the yes branch of 260), then indication is made (at block 266) that the ASC i is over performing with respect to the SLG requirements. Control then proceeds (at block 268) back to block 254 to consider any further application service connections (ASCs) 150a, 150b . . . 150l in the ASGs 158a, 158b . . . 158n to which the SLG 156a, 156b applies.

After processing all the ASCs, control proceeds (at block 270) to block 280 in FIG. 12 where the SLA server 16 collects (at block 280) the results of performance information and stores that information in the SLA database 20. The performance analyzer 22 receives the information for ASCs in ASGs, and determines the actions that need to be performed. If (at block 282) no ASCs are under performing, then the SLA server 16 signals (at block 284) the performance gateway(s) 14a, 14b (FIGS. 1 and 2), to which the just considered application service connections (ASCs) 150a, 150b . . . 150l are connected, to end throttling for any of the ASCs that are determined not to be under performing. This will end any throttling of ASCs which are not performing at the level specified in the checked service level guarantee (SLG), which meets the criteria specified in the service level agreements associated with the ASCs. If certain of the considered ASCs 150a, 150b . . . 150l are underperforming (from the no branch of block 282) and some are over performing (at block 286), then the SLA server 16 signals (at block 288) the performance gateways 14a, 14b, to which the just considered ASCs are connected, to throttle over performing ASCs in the ASG(s) associated with the SLG being checked to slow down their performance and direct network storage resources toward the under performing ASCs associated with the SLG. The signaled performance gateways 14a, 14b may delay forwarding I/O requests transmitted on the over performing ASCs to improve the performance of the I/O requests transmitted on the underperforming ASCs by giving priority to I/O requests transmitted on the under performing ASCs. The performance gateway 14a, 14b may use any throttling technique known in the art to direct resources away from over performing ASCs to the under performing ones.

If (from the no branch of block 286) there are under performing ASCs, but no over performing ASCs to throttle, then the SLA server 16 generates (at block 290) an alert to notify the storage service provider of the underperforming ASCs. The storage service provider may be notified through the SLA client 28.

Figure 13:
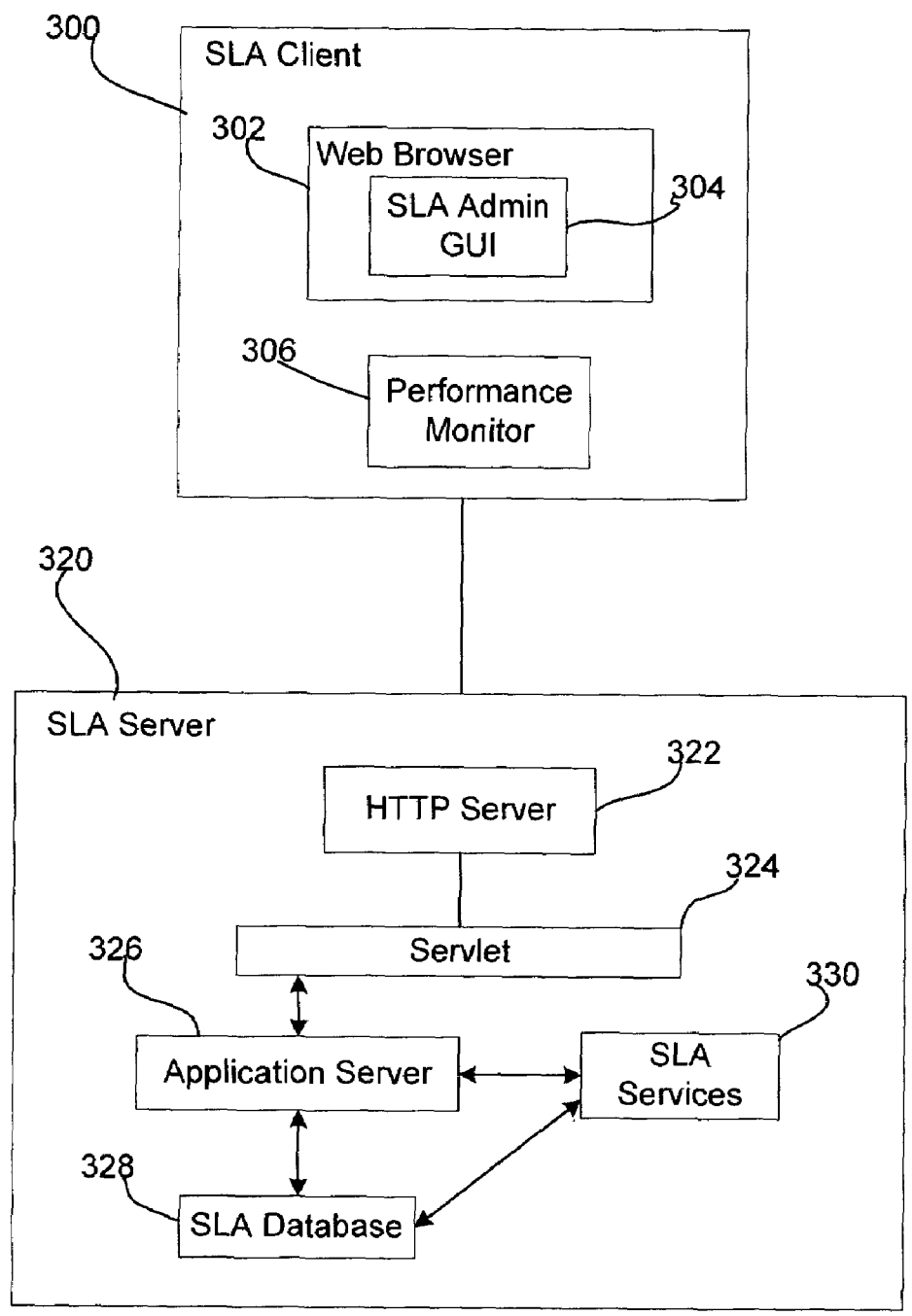
FIG. 13 illustrates a computing architecture that may be used to implement the network components described with respect to FIGS. 1 and 2.

FIG. 13 illustrates an implementation of the SLA server 16 and SLA client 28 in a web service based architecture. The SLA client 300 may include a web browser 302 that renders an SLA administrative graphical user interface (GUI) 304 through which the network administrator may interact with the SLA server 320. The SLA client 300 further includes a performance monitor 306 component that presents the response time in real-time to the network administrator from the performance information gathered by the SLA server 320. The SLA server 320 includes an HTTP server 322 to enable communication with the client web browser 302 and a Java servlet 324 to transfer information received at the HTTP server 322 to an application server 326 and to transfer information from the application server 326 through the HTTP server 322 to the client web browser 302. For instance, the application server 326 may transfer real-time performance data from the SLA database 328 to the client performance monitor 306

The application server 326 further collects configuration requests and sends monitoring displays to and from the servlet 324, and passes requests to other components. The SLA database 328 comprises a database manager and database that maintains the various defined ASCs, ASGs, SLGs, SLCs, service level agreements, etc., stores collected performance data, and generates reports. SLA services 330 may include the throttling policies and conduct performance analysis and the policy based throttling control.

In the described embodiments, the SLA server 16 attempts to automatically alter how I/O requests are processed to direct more network storage resources to ASCs that are not satisfying certain service level agreement criteria defined in service level guarantees. In certain implementations, this is accomplished by throttling or delaying the processing of I/O requests transmitted on ASCs that are over performing. In this way, SLA server 16 may automatically adjust the network to rebalance the distribution of network resources away from application service connections that are over performing to under performing ASCs. This allows adjustments to the network to boost under performing I/O paths without having to add additional network storage resources.

In web service based architectures, such as shown in FIG. 13, all the information within the SLA database may be implemented as XML files created by the storage service provider at the SLA client 28. FIG. 14*a* illustrates how the service level agreement elements, such as the ASGs and ASCs are defined in an XML format, where the ASGs and ASCs are tagged elements having as attributes the information. FIG. 14*b* illustrate how the service level commitment information is implemented in the XML format wherein a SLC element has various attributes that define the information for the service level commitment (SLC). There may be multiple SLC elements in one XML document or dispersed across multiple XML documents. Similarly, FIG. 14*c* illustrates how the service level guarantee (SLG) information is implemented in the XML format with a SLG element including attributes defining the values for the specific SLG element. There may be multiple SLG elements in one XML document or dispersed across multiple XML documents.

Additional Implementation Details

The network management described herein may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The described embodiments define a particular arrangement of information on I/O paths between hosts and storage (application service connections), an arrangement of I/O paths (application service groups), service level criteria (service level agreements), and a service level commitment that associates service level criteria with particular I/O paths. In alternative implementations, this relationship of service level agreement criteria to actual host I/O paths may be represented in alternative relationships and data structures than described herein.

In the described implementations, the I/O paths between host and storage are handled by performance gateways implemented in a virtualization controller. In alternative implementations, the monitoring of I/O requests and I/O paths may occur at either the host or storage level, thereby avoiding the need for the use of a separate virtualization controller and virtualization layer.

The storage volume associated with an application storage connection may comprise a virtual volume managed in a virtualization layer or a physical volume on a storage device.

FIGS. 11 and 12 describe specific operations occurring in a particular order. In alternative implementations, certain operations may be performed in a different order, modified or removed. Morever, steps may be added to the above described logic and still conform to the described implementations. Further, operations described herein may occur sequentially or certain operations may be processed in parallel. Yet further, operations may be performed by a single processing unit or by distributed processing units.

Figure 15:
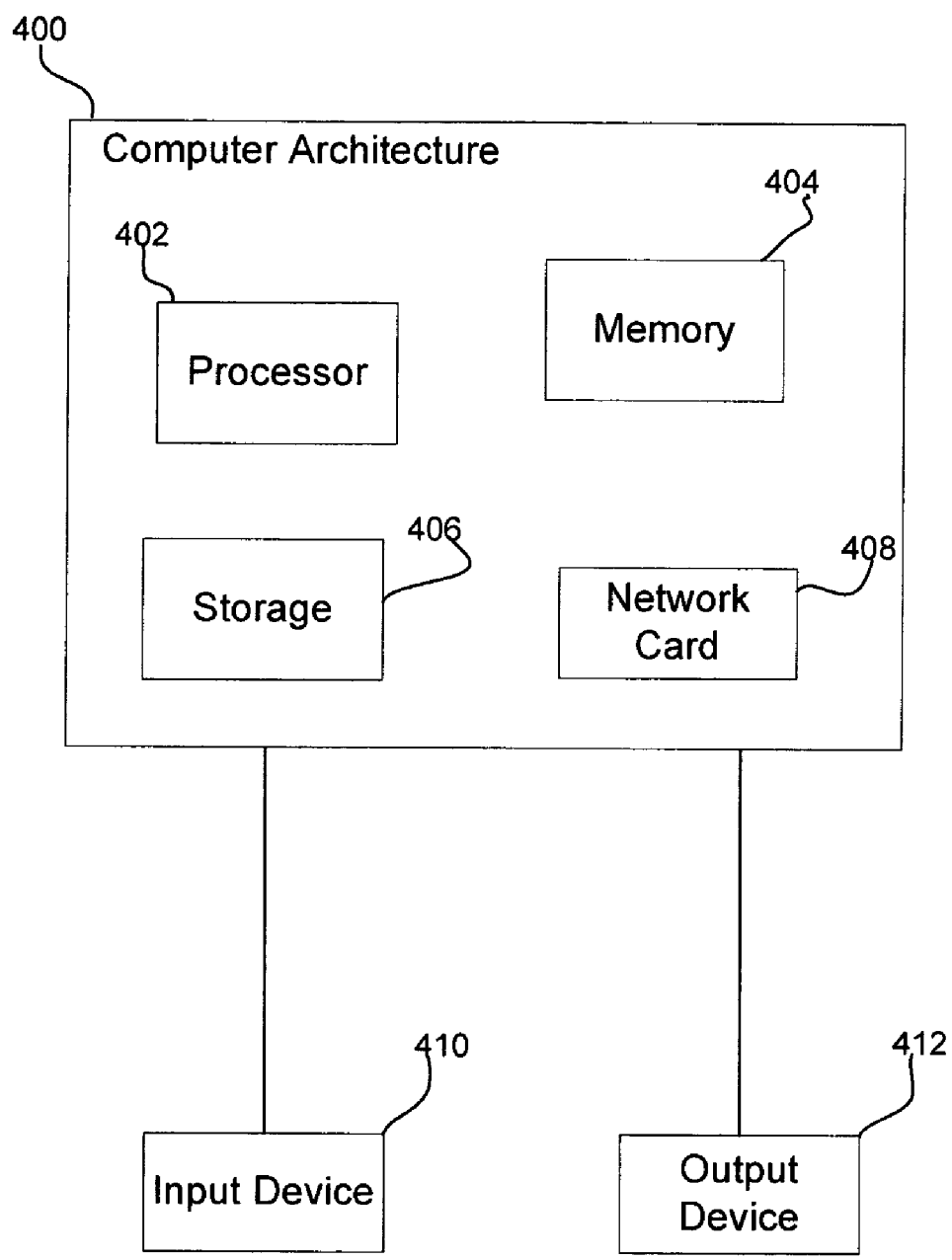
FIG. 15 illustrates an implementation of a computer architecture of the network components shown in FIGS. 1, 2, and 7.

FIG. 15 illustrates one implementation of a computer architecture 400 of the network components shown in FIGS. 1, 2, and 7, such as the host, storage systems, virtualization controller, etc. The architecture 400 may include a processor 402 (e.g., a microprocessor), a memory 404 (e.g., a volatile memory device), and storage 406 (e.g., a non-volatile storage, such as magnetic disk drives, optical disk drives, a tape drive, etc.). The storage 406 may comprise an internal storage device or an attached or network accessible storage. Programs in the storage 406 are loaded into the memory 404 and executed by the processor 402 in a manner known in the art. The architecture further includes a network card 408 to enable communication with a network. An input device 410 is used to provide user input to the processor 402, and may include a keyboard, mouse, pen-stylus, microphone, touch sensitive display screen, or any other activation or input mechanism known in the art. An output device 412 is capable of rendering information transmitted from the processor 402, or other component, such as a display monitor, printer, storage, etc.

The foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for managing a network providing Input/Output (I/O) paths between a plurality of host systems and storage volumes in storage systems, comprising:
   providing an application service connection definition for each of the I/O paths from a host to a storage volume;
   providing at least one service level guarantee definition indicating performance criteria to satisfy service requirements included in at least one service level agreement with at least one customer for network resources;
   associating each service level guarantee definition with at least one application service connection definition;

gathering, by a virtualization controller mapping physical storage resources to virtual volumes in a virtualization layer, Input/Output (I/O) performance data for I/O requests transmitted through the I/O paths;

transmitting, by the virtualization controller, the gathered performance data to a service level agreement server;

determining, by the service level agreement server, performance data maintained for the application service connection for which the gathered performance data was received;

updating, by the service level agreement server, the determined performance data with the performance data received from the virtualization controller;

monitoring, by the service level agreement server, whether the performance data for application service connections indicating the I/O requests transmitted through the I/O paths satisfy the performance criteria indicated in the service level guarantee definition associated with the application service connection definitions for the I/O path; and transmitting, by the service level agreement server, commands to the virtualization controller to throttle I/O transmission over at least one connection in response to determining that the performance data for at least one application service connection for the connection does not satisfy the performance criteria.

2. The method of claim 1, wherein monitoring whether the I/O requests transmitted through the I/O path satisfy performance criteria indicated in the service level guarantee definition comprises:

gathering performance information concerning I/O requests for the I/O paths;

selecting one of the at least one service level guarantee definition; and for each of the I/O paths identified by the application service connection definition associated with the selected service level guarantee definition, comparing the gathered performance information for the I/O path with the performance criteria indicated in the selected service level guarantee definition.

3. The method of claim 2, further comprising:

adjusting operations among the I/O paths represented by the application service connection definitions associated with the selected service level guarantee definition if the gathered performance information for the I/O paths does not satisfy the performance criteria.

4. The method of claim 3, wherein adjusting the operations comprises:

determining the I/O paths that are over performing and under performing with respect to the performance criteria; and throttling the transmission of the I/O requests through the determined I/O paths that are over performing.

5. The method of claim 4, wherein throttling the transmissions comprises delaying the processing of the I/O requests transmitted through the over performing I/O paths.

6. The method of claim 2, wherein the gathering of the performance information for the I/O paths comprises determining an I/O response time and I/O demand at the I/O paths and comparing the determined I/O response time and the I/O demand with the performance criteria for the I/O response time and the I/O demand in the selected service level guarantee definition.

7. The method of claim 6, wherein the I/O demand comprises I/O operations per second per unit of contracted storage capacity and I/O throughput per contracted storage capacity.

8. The method of claim 7, wherein one of the I/O paths is under performing if a percentage of I/O response times measured for the I/O path is less than a percentage guarantee indicated in the selected service level guarantee definition.

9. The method of claim 7, wherein one of the I/O paths is under performing if the I/O demand exceeds a demand criteria indicated in the service level guarantee definition and a sampling of the determined I/O response time is less than a response time criteria indicated in the service level guarantee definition.

10. The method of claim 1, further comprising:

providing an application service group identifying a plurality of application service connection definitions, wherein associating the at least one service level guarantee definition with the application service connection definitions comprises associating the at least one service level guarantee definition with the at least one application service group, wherein the application service connection definitions identified in the application service group are associated with the service level guarantee definition with which their application service group is associated.

11. The method of claim 10, further comprising:

providing a service level commitment record associating one service level agreement definition with the at least one application service group.

12. The method of claim 10, wherein at least one Extended Markup Language (XML) document includes one element for each of the at least one application service group, and wherein the element for each of the at least one application service group includes one sub-element for each application service connection definition included in that application service group, wherein each application service connection definition subelement includes attributes providing information on the application service connection definition.

13. The method of claim 1, wherein multiple service level guarantee definitions indicating different performance criteria are associated with different sets of application service connection definitions.

14. The method of claim 13, wherein the application service definition for the I/O paths may be associated with the multiple service level guarantee definitions, wherein the monitoring comprises determining whether the I/O requests transmitted through the I/O paths satisfy the performance criteria of all associated service level guarantee definitions.

15. The method of claim 1, wherein each service level guarantee definition is implemented as a separate element in at least one Extended Markup Language (XML) document, the element for the service level guarantee definition includes the performance criteria defined in the service level agreement, and wherein the application service connection definition for each of the I/O paths is implemented as an element in the at least one XML document, wherein attributes of the application service connection definition element provide information on the I/O path.

16. The method of claim 1, wherein the network comprises a Storage Area Network (SAN).

17. The method of claim 1, wherein the at last one application service connection definition, the at least one service level agreement, and the at least one service level guarantee definition, are provided by the service level agreement server in a web service architecture that interfaces with a client to provide real time performance information on the I/O paths to the client.

* * * * *